UNITED STATES PATENT OFFICE.

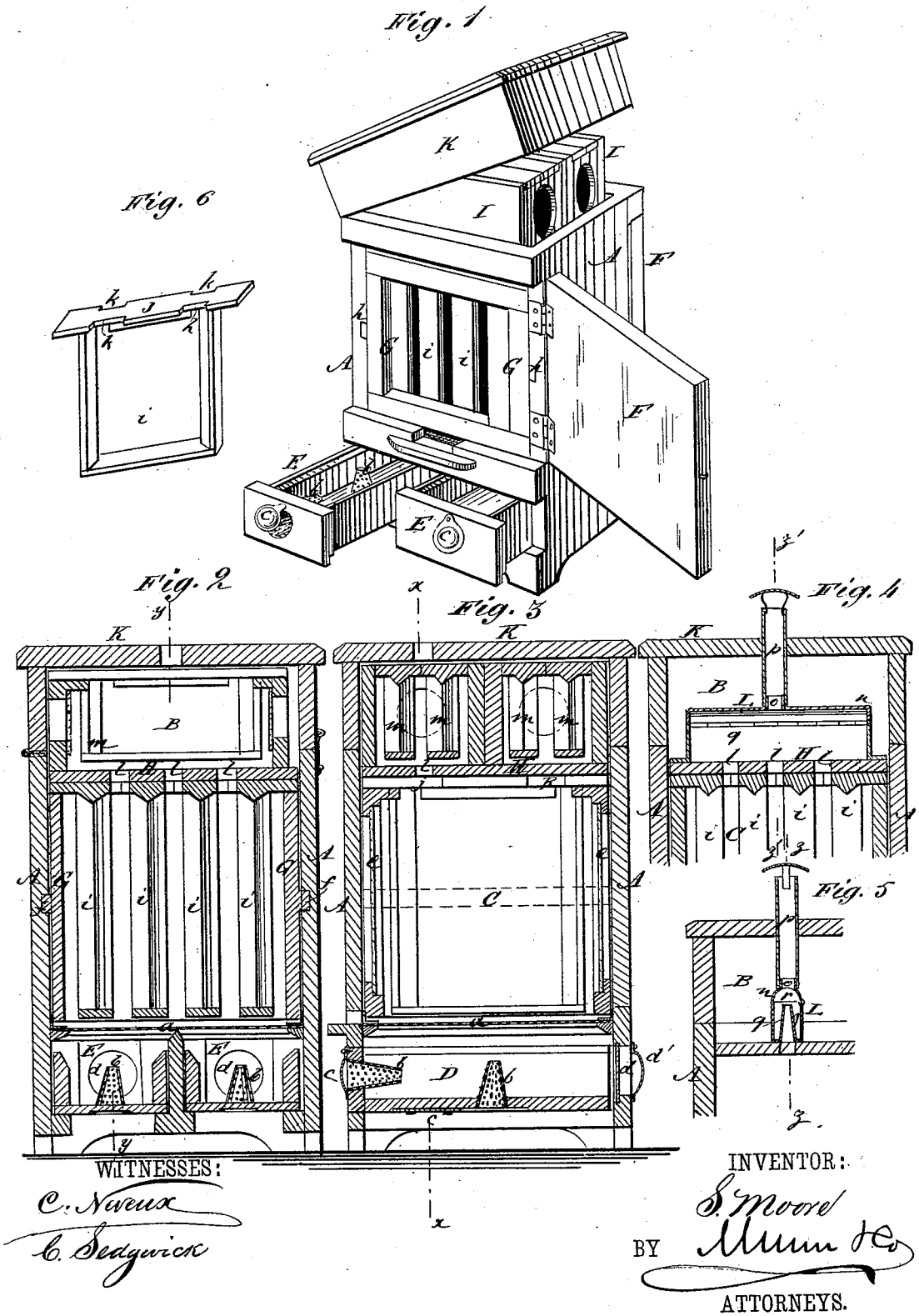

SAMUEL MOORE, OF NEW SALEM, ILLINOIS.

BEE-HIVE.

SPECIFICATION forming part of Letters Patent No. 228,666, dated June 8, 1880.

Application filed April 24, 1879.

*To all whom it may concern:*

Be it known that I, SAMUEL MOORE, of New Salem, in the county of Pike and State of Illinois, have invented a new and Improved Bee-Hive, of which the following is a specification.

The object of the invention is to provide a bee-hive with means whereby it may be thoroughly ventilated, and the bees thus always kept in a healthy and vigorous condition.

In the accompanying drawings, Figure 1 is a perspective view of my improved hive. Fig. 2 is a vertical section of the hive on line $x\,x$ of Fig. 3. Fig. 3 is a vertical section on line $y\,y$ of Fig. 2. Fig. 4 represents, in vertical longitudinal section on line $z\,z$ of Fig. 5, the arrangement of the ventilator. Fig. 5 is a cross-section of the same on line $z'\,z'$, Fig. 4. Fig. 6 represents one of the comb-frames.

Similar letters of reference indicate corresponding parts.

Referring to the drawings, A represents the casing of the hive, divided into an upper surplus-honey-box apartment, B, a middle hive portion, C, and a lower insect-trap part, D.

The insect-trap is divided from the hive portion by a wire-cloth screen, $a$, and is fitted with two draws, E E, open at the inner ends, and provided in the bottom and outer ends with openings protected on the inside by conoidal screens $b$, and on the outside with doors $c$, by which they can be completely covered when necessary, as in the winter-time, to exclude the cold.

In the side of the casing opposite that at which the draws are entered are windows $d$, through which the insect-trap can be inspected. Over these windows, on the outside, are pivoted doors $d'$.

The insects entering the draws through the openings therein are prevented from getting up into the hive by the screen $a$, and the conoidal screens $b$ prevent them from getting out. They are thus caught and can be removed by taking out the draws.

Opposite sides of the casing at the middle hive part C are hinged and formed into doors F F.

The walls of the hive are doubled by forming a case, G, with two wooden sides and glass fronts, $e\,e$. The wooden sides are provided with guides $f\,f$, which slide in ways $h\,h$ in the casing of the hive, so that the glass fronts are adjacent to the hinged doors of the case, as clearly shown in Fig. 1.

The comb-frames $i$ are hung in the case G by allowing the projecting ends of the top piece, $j$, of said frames to rest on the top edge of the said case, as in Fig. 3. The edges of this piece are provided with notches $k$ to give passage-way for the bees to the surplus-honey boxes above.

On top of the case G and the comb-frames is placed a floor, H, with holes $l$, for the passage of the bees.

I I are the surplus-honey boxes placed on the floor H. They are provided with comb-frames $m\,m$, hanging from the top by their projecting ends resting on the edges of the boxes. The boxes have no bottoms, so that the bees pass from the hive below directly to the comb-frames.

K is the top of the hive, hinged on one edge, and adapted to fold down over the honey-boxes in the manner shown more particularly in Fig. 1.

The hive thus arranged is adapted to the honey season. The arrangement of the lower part of the hive is such that the inroads of insects will be effectually prevented.

In the winter, when the surplus-honey boxes can be removed, I provide the hive with a ventilator for carrying off the dampness, which is shown fully in Figs. 4 and 5. It consists of a tin box, L, with a perforated bottom and a hinged cover, $n$, with a short tube, $o$, extending up from it, to which is connected a pipe, $p$, extending through the top of the hive. Inside the box are plates $q\,q$, inclined toward each other at the top, so as to leave a narrow slot, $r$, just over the perforations in the bottom.

When the hive is prepared for the winter, and the surplus-honey boxes are removed, the box L is placed on the floor H with the perforations in its bottom over the holes $l$ in the floor, and in this position it is secured. The top is then shut down and the pipe $p$ entered and joined to the ventilator, as shown in Figs. 4 and 5. Now, the dampness caused by the breathing of the bees is carried off through the ventilator.

Having thus described my invention, I claim as new and desire to secure by Letters Patent—

In combination with the hive, the ventilator composed of the box L, having perforated bottom and hinged top, pipe p, leading outside the top K, and inside inclined plates, q q, with a slot, r, between the upper edges of said plates and over the perforations in the bottom, all arranged and adapted to carry off the dampness from the hive, substantially as described.

SAMUEL MOORE.

Witnesses:
  E. E. GRAY,
  M. M. SLEARER.